(12) United States Patent
Marissal

(10) Patent No.: US 8,349,947 B2
(45) Date of Patent: Jan. 8, 2013

(54) SLURRY PHASE POLYMERISATION PROCESS

(75) Inventor: Daniel Marissal, Saussest les Pins (FR)

(73) Assignee: Ineos Manufacturing Belgium NV, Antwerpen (BE)

( * ) Notice: Subject to any disclaimer, the term of this patent is extended or adjusted under 35 U.S.C. 154(b) by 0 days.

(21) Appl. No.: 13/503,817

(22) PCT Filed: Oct. 28, 2010

(86) PCT No.: PCT/EP2010/066314
§ 371 (c)(1),
(2), (4) Date: Apr. 24, 2012

(87) PCT Pub. No.: WO2011/051367
PCT Pub. Date: May 5, 2011

(65) Prior Publication Data
US 2012/0208960 A1    Aug. 16, 2012

(30) Foreign Application Priority Data

Oct. 30, 2009  (EP) .................................... 09174646

(51) Int. Cl.
*C08F 2/14* (2006.01)
*C08F 2/12* (2006.01)
*C08F 10/02* (2006.01)

(52) U.S. Cl. ............. 524/855; 526/64; 526/88; 526/918

(58) Field of Classification Search .................... 526/64, 526/88, 918; 524/855
See application file for complete search history.

(56) References Cited

U.S. PATENT DOCUMENTS

| 3,229,754 A | 1/1966 | Hoag |
| 3,248,179 A * | 4/1966 | Norwood ...................... 422/132 |

FOREIGN PATENT DOCUMENTS
EP           0 891 990 A2    1/1999

* cited by examiner

*Primary Examiner* — Fred M Teskin
(74) *Attorney, Agent, or Firm* — Nixon & Vanderhye

(57) ABSTRACT

Process for polymerising, in a loop reactor, at least one olefin monomer in a liquid diluent to produce a slurry comprising solid particulate olefin polymer and said diluent, wherein the ratio between the actual volumetric solids concentration of the slurry and the maximum possible geometric volume solids concentration of the slurry as measured by the bulk density of an unpacked settled bed of particles, SVCR, is V*0.065 or greater, and the ratio of the cumulative settling distance of an average size particle at any point in the reactor in any direction perpendicular to the direction of the flow, to the internal diameter of the loop reactor, is maintained below [0.084*(V−6.62)+(0.69−SVCR)* 1.666], where V is the circulation velocity of the slurry in m/s and "cumulative settling distance" is defined as the cumulative distance, expressed as a fraction of the diameter, travelled by a particle in any direction perpendicular to the direction of the flow since the previous upstream pump.

13 Claims, 4 Drawing Sheets

SLURRY PHASE POLYMERISATION PROCESS

This application is the U.S. national phase of International Application No. PCT/EP2010/066314 filed 28 Oct. 2010 which designated the U.S. and claims priority to European Patent Application No. 09174646.1 filed 30 Oct. 2009, the entire contents of each of which are hereby incorporated by reference.

The present invention relates to olefin polymerisation in slurry phase loop reactors.

BACKGROUND OF THE INVENTION

Slurry phase polymerisation of olefins is well known wherein an olefin monomer and optionally olefin comonomer are polymerised in the presence of a catalyst in a diluent in which the solid polymer product is suspended and transported.

The present invention is more particularly concerned with polymerisation in a loop reactor where the slurry is circulated in the reactor typically by means of a pump or agitator. Liquid full loop reactors are particularly well known in the art and are described for example in U.S. Pat. Nos. 3,152,872, 3,242,150 and 4,613,484.

Polymerisation is typically carried out at temperatures in the range 50-125° C. and at pressures in the range 1-100 bara. The catalyst used can be any catalyst typically used for olefin polymerisation such as chromium oxide, Ziegler-Natta or metallocene-type catalysts. The product slurry, comprising polymer and diluent and in most cases also catalyst, olefin monomer and comonomer can be discharged intermittently or continuously, optionally using concentrating devices such as hydrocyclones or settling legs to minimise the quantity of fluids withdrawn with the polymer.

The loop reactor is of a continuous tubular construction comprising at least two, for example four, vertical sections and at least two, for example four, horizontal sections. The heat of polymerisation is typically removed using indirect exchange with a cooling medium, preferably water, in jackets surrounding at least part of the tubular loop reactor. The volume of the loop reactor can vary but is typically in the range 20 to 250 m$^3$; the loop reactors of the present invention are of this generic type.

Maximum commercial scale plant capacities have increased steadily over the years. Growing operating experience over the last few decades has led to operation of increasingly high slurry and monomer concentrations in reaction loops. The increase in slurry concentrations has typically been achieved with increased circulation velocities achieved for example by higher reactor circulation pump head or multiple circulation pumps as illustrated by EP 432555A and EP 891990A. The increase in solids loading is desirable to increase reactor residence time for a fixed reactor volume and also to reduce downstream diluent treatment and recycling requirements (a higher solids concentration obviously corresponds to a reduced proportion of diluent). The increased velocity and pressure drop requirement of the loop has however led to increasing pump design sizes and complexity, and also increasing energy consumption as slurry concentrations increase. This has both capital and operating cost implications.

Historically the circulation velocity in the reaction loop has typically been maximised to ensure maintenance of good thermal, compositional and particle distribution across the reactor cross-section, particularly the avoidance of solids settling, stable flow characteristics, or excessive solids concentrations at the pipe wall. Inadequate cross-sectional distribution could lead to increased fouling, reduced heat transfer and reduced polymer productivity and homogeneity. For example, WO 2004024780 discloses in Tables 2 and 3 circulation velocities of at least 6.9 m/s in order to avoid saltation, which is the phenomenon of particles bouncing along the wall of the reactors rather than being wholly suspended in the diluent.

We have found that it is in fact possible to operate at lower circulation velocities and/or higher solids concentrations than typically used in the prior art by careful optimisation of the geometry of the reactor, so as to minimise the degree of uneven cross-sectional distribution of solid polymer. More specifically, we have found that it is possible to calculate the effect of gravitational and centrifugal forces acting on the slurry which contribute to an uneven cross-sectional distribution of solids, so that the reactor geometry can be designed such that the net effect of those forces in any particular direction is minimised.

The present invention therefore provides a process for polymerising, in a loop reactor, at least one olefin monomer in a liquid diluent to produce a slurry comprising solid particulate olefin polymer and said diluent, wherein the ratio between the actual volumetric solids concentration of the slurry and the maximum possible geometric volume solids concentration of the slurry as measured by the bulk density of an unpacked settled bed of particles, SVCR, is V*0.065 or greater, and the ratio of the cumulative settling distance of an average size particle at any point in the reactor in any direction perpendicular to the direction of the flow, to the diameter of the loop reactor, is maintained below [0.084*(V−6.62)+(0.69−SVCR)*1.666], where V is the circulation velocity of the slurry in m/s and "cumulative settling distance" is defined as the cumulative distance, expressed as a fraction of the diameter, travelled by a particle in any direction perpendicular to the direction of the flow since the previous upstream pump. It is preferred that V is less than 9.5 m/s. It is also preferred that the ratio of the cumulative settling distance of an average size particle at any point in the reactor in any direction perpendicular to the direction of the flow, to the diameter of the loop reactor, is maintained below 0.37.

SUMMARY OF THE INVENTION

In an alternative aspect, the present invention provides a process for polymerising, in a loop reactor, at least one olefin monomer in a liquid diluent to produce a slurry comprising solid particulate olefin polymer and said diluent, wherein the circulation velocity of the slurry in m/s, V, is less than 9.5 m/s, and the ratio of the cumulative settling distance of an average size particle at any point in the reactor in any direction perpendicular to the direction of the flow, to the diameter of the loop reactor, is maintained below the smaller of 0.37 or [0.084*(V−6.62)+(0.69−SVCR)*1.666], where SVCR is the ratio between the actual volumetric solids concentration of the slurry and the maximum possible geometric volume solids concentration of the slurry as measured by the bulk density of an unpacked settled bed of particles, and "cumulative settling distance" is defined as the cumulative distance, expressed as a fraction of the diameter, travelled by a particle in any direction perpendicular to the direction of the flow since the previous upstream pump. In this aspect of the invention, it is preferred that the SVCR is at least 0.062*V.

Comments below refer to both aspects of the invention.

As stated above, the cumulative settling distance in a particular direction perpendicular to the direction of flow is defined as the total distance, expressed as a fraction of the diameter, moved by an average particle in that direction since its passage through the previous pump upstream. In a reactor with a single pump, this can be at any point during one complete circuit of the reactor, and analysis is therefore based on calculation of the cumulative settling distance in one complete circuit of the reactor. The cumulative settling distance is calculated by adding the settling distances for each section of the reactor circuit—horizontal or vertical straight legs, and bends. Frequently the maximum cumulative settling distance occurs immediately before the next pump—ie after one complete circuit of the reactor if the reactor has just one pump. However it may occur at an intermediate point in the reactor.

As mentioned above, the term "cumulative settling distance" is intended to refer to the ratio of cumulative settling distance to reactor diameter, and is therefore expressed as a fraction. A cumulative settling distance of 0.25 means that the particle has moved a total of 0.25D in the particular direction perpendicular to the flow, ie towards the reactor wall (D=diameter of the reactor).

In straight horizontal sections of the loop reactor, gravitational forces cause a net movement of the solid particles downwards towards the lowest part of the reactor wall. In all elbows (bends) in the loop reactor, centrifugal forces cause a net movement of particles towards the outer wall. In straight vertical sections of the loop reactor, there are of course no centrifugal forces, and the gravitational force towards any particular wall is zero. The net movement in a particular direction in these different types of sections may be additive, or it may be opposing. For example, where a horizontal section is followed by an elbow turning vertically upwards, the centrifugal force in the elbow acts to push the particles in the same direction as the gravitational force in the horizontal section. However if the elbow is turning downwards, the centrifugal force acts to push the particles in the opposite direction to the gravitational force in the previous horizontal section.

It will be clear that the greater the CSD in any particular direction, the further towards the reactor wall the particles will migrate during their passage around the reactor, and therefore the greater the inhomogeneity in the cross-sectional particle distribution. Such inhomogeneous distribution can lead to the formation of slugs of solid polymer, especially if the solids concentration is high. The appearance of slugs in reactor circulation is dependent not only on cumulative settling as indicated by CSD, but also the volumetric solids concentration. If the solids concentration is low, although the settling increases it there is more margin before the slurry reaches an excessive concentration at the walls, and so slug formation will be reduced. In this case the acceptable settling distance according to the invention can be relatively large. On the contrary, if the solids concentration is already very high in the reactor, even a relatively short CSD will be sufficient to form a thick layer of polymer slurry on the reactor wall, and slug formation occurs rapidly. In such a case the acceptable CSD is very low. Slug formation results in fluctuation in the pressure drop and power consumption of the reactor pump: above a certain level this can result in reactor plugging due to interruption of the continuous flow pattern.

It is preferred that the ratio of the cumulative settling distance of an average size particle at any point in the reactor in any direction perpendicular to the direction of the flow, to the diameter of the loop reactor, is maintained below $0.9*[0.084*(V-6.62)+(0.69-SVCR)*1.666]$, and more preferably below $0.8*[0.084*(V-6.62)+(0.69-SVCR)*1.666]$.

The circulation velocity in the reactor is calculated from the reactor volume flow divided by the reactor pipe section. The power consumption of the plant is used to check that the operating flow rate is close to the design flow rate by comparing the pump curve with the power consumed.

Regarding the solids concentration at which circulation problems begin to occur, there is an absolute maximum volumetric concentration achievable in a slurry loop reactor, above which the circulation cannot continue. This is due to the effect of friction between the particles, which substantially increases the apparent viscosity of the slurry when the concentration becomes so high that the particles are very close to each other. This is described by the Mooney equation, which links the apparent slurry viscosity to the liquid viscosity and the solids concentration.

The reactor solids concentration is determined by using a density meter located in a vertical leg of the reactor to estimate the solids wt % in the slurry. This is calculated approximately as (1/Rho slurry=% wtsolids/Rho PE+(1−% wtsolids)/Rho diluent). Rho slurry is directly measured by the density meter, Rho liquid is known from public data or correlation, and Rho PE is deterrmined by an analytical method such as a gradient column.

There is also a separate geometrical maximum concentration, corresponding to the density of a close-packed powder bed, which cannot be exceeded. It is this concentration which is used to determine the solids volume concentration ratio SVCR utilised in the present invention. This geometrical maximum $Vol_{max}$ can be calculated using the formula $$Vol_{max} = Rho_{bulk}/Rho_p$$

where $Rho_{bulk}$ is bulk density and $Rho_p$ is particle apparent density (apparent density takes into account the pores in the material) of the polyolefin.

The particle apparent density is determined by inserting a pseudo fluid made of very fine glass balls into the interstitial volume and measuring the weight of the pseudo fluid inserted. This permits measurement specifically of the apparent density of the particles, since the pores of the polyethylene powder are too small to allow the pseudo fluid to enter. Details of this method can be found from Micrometrics. Bulk density is measured according to ISO R60: the polyolefin is freely poured through a funnel into a measuring cup of a known volume, and by weighing the measuring cup empty and full, the bulk density is determined.

We have found that the slurry circulation in the reactor leads to excessive pressure drop and power consumption when the ratio of the actual volumetric solids concentration to the maximum geometrical concentration exceeds 0.7. Therefore an objective of the invention is to ensure that the cumulative settling distance is sufficiently short that the proportion of the reactor where this concentration is exceeded due to settling is minimised.

Settling can occur towards any longitudinal axis of the tubular reactor wall. Therefore the cumulative settling distance (CSD) needs to be determined in four perpendicular directions across the tubular reactor cross-section, although in fact CSD values for opposite directions will of course be inversely related, so only two perpendicular directions need to be calculated. The objective of the invention is to maintain all four CSD values below the limit specified above. This can be achieved by designing the reactor geometry, such as the direction and radius of elbows and direction and length of horizontal sections, so that the CSD in any one direction is minimised. By doing so, it is possible to limit the above-mentioned slug formation and associated problems to acceptable levels and thereby permit successful operation at higher solids concentrations.

The settling distances for each section of the reactor are calculated using well-known principles, as set out below. It is assumed that all polymer particles have a constant longitudinal velocity throughout their circuit of the reactor, and that the only change is in the radial position relative to the longitudinal axis of the reactor.

For any horizontal section of a loop reactor, the rate of settling of the solid particles downwards towards the lowest part of the reactor wall is calculated by the following formula:

Settling velocity $V_s = 1.74 * (d * (Rho_p - Rho_f)/Rho_f * g)^{0.5}$

Where d=average particle diameter
$Rho_p$=apparent density of the particle
$Rho_f$=fluid density
g=gravitational acceleration, 9.81 m/s².

The particle diameter is measured by sieve trays, and the average particle size is the D50 of the particle size distribution.

For any elbow (bend) in the loop reactor, the settling velocity is calculated using the same equation as above, but with g being replaced by the centrifugal acceleration, $V^2/R_{elbow}$, where V is the circulation velocity of the slurry in the reactor and $R_{elbow}$ is the radius of curvature of the elbow. In the elbow, horizontal settling due to gravitational forces is ignored.

In both the above cases, the settling velocity $V_s$ is then adjusted to take into account the solids concentration: higher concentrations reduce the velocity. This adjustment is made by multiplying $V_s$ by $(1-C_{vol})^{2.33}$ where $C_{vol}$ is the volumetric concentration of the slurry expressed as a fraction.

Once $V_s$ has been calculated, the settling distance is obtained by dividing $V_s$ by the amount of time the particle spends in the particular section, which is of course equal to the slurry velocity divided by the length of the section. The settling distances for each section in the flow path are then added (or subtracted where appropriate) in order to obtain the cumulative settling distance ratio CSD.

From the cumulative settling distance ratio, it is possible to calculate an approximate concentration profile for the slurry in its passage around the reactor, and thereby obtain an estimate of the thickness of areas of high concentration. Settling towards the wall ultimately causes a buildup of settled particles on the wall as the solids volume concentration ratio SVCR increases to its maximum of 1.0, and the greater the cumulative settling distance the greater the thickness of the layer of particles. As previously mentioned, the formation of areas of high concentration or settled particles close to the reactor wall can lead to various disadvantages such as fluctuations in reactor pressure and pump power requirements. This begins to occur locally if the SVCR exceeds 0.6, and significant problems are likely to be encountered if the buildup of settled particles—areas with an SVCR of 1.0— increases to 0.5D or greater.

The process of the invention can apply to any olefin polymerisation which takes place in slurry in a loop reactor. Most usually the olefin is ethylene or propylene. Typically, in the slurry polymerisation process of polyethylene, the slurry in the reactor will comprise the particulate polymer, the hydrocarbon diluent(s), (co) monomer(s), catalyst, chain terminators such as hydrogen and other reactor additives In particular the slurry will comprise 20-75, preferably 30-70 weight percent based on the total weight of the slurry of particulate polymer and 80-25, preferably 70-30 weight percent based on the total weight of the slurry of suspending medium, where the suspending medium is the sum of all the fluid components in the reactor and will comprise the diluent, olefin monomer and any additives; the diluent can be an inert diluent or it can be a reactive diluent in particular a liquid olefin monomer; where the principal diluent is an inert diluent the olefin monomer will typically comprise 0.5-20, preferably 1-6 weight percent of the total weight of the inert diluent.

The slurry is pumped around the relatively smooth path-endless loop reaction system at fluid velocities sufficient to (i) maintain the polymer in suspension in the slurry and (ii) to maintain acceptable cross-sectional concentration and solids loading gradients.

The solids concentration in the slurry in the reactor will typically be above 20 vol %, preferably about 30 volume %, for example 20-40 volume %, preferably 25-35 volume % where volume % is [(total volume of the slurry–volume of the suspending medium)/(total volume of the slurry)]×100. The solids concentration measured as weight percentage which is equivalent to that measured as volume percentage will vary according to the polymer produced but more particularly according to the diluent used. Where the polymer produced is polyethylene and the diluent is an alkane, for example isobutane it is preferred that the solids concentration is above 40 weight % for example in the range 40-60, preferably 45%-55 weight % based on the total weight of the slurry.

Generally it is preferred that for reaction conditions of 70-100° C. and 20-40 bar, which covers much of the range of polymerisation conditions to which the invention applies, the diluent should have a density of at least 500 kg/m³. A higher density diluent means a lower settling velocity for the polymer particles and hence a lower CSD.

It can be seen from the above discussion that for a given set of process conditions—polymer, diluent, velocity and solids concentration—the cumulative settling distance is dependent solely on the geometry of the reactor. Therefore a key feature of the invention is design of the reactor geometry in order to minimise the CSD.

Once the basis of the invention as described above is appreciated, the skilled person will have no difficulty in optimising the design of the reactor geometry so as to minimise the CSD. For instance, it will be immediately apparent that a long horizontal distance will result in a significant degree of gravitational settling. Therefore this should either be avoided, or alternatively balanced by a similar length or lengths in which the gravitational settling is operating on the opposite side of the pipe, which would occur for example if the pipe loops back on itself.

BRIEF DESCRIPTION OF THE DRAWINGS

The invention is further described with reference to the accompanying drawings, in which.

Figure 1:
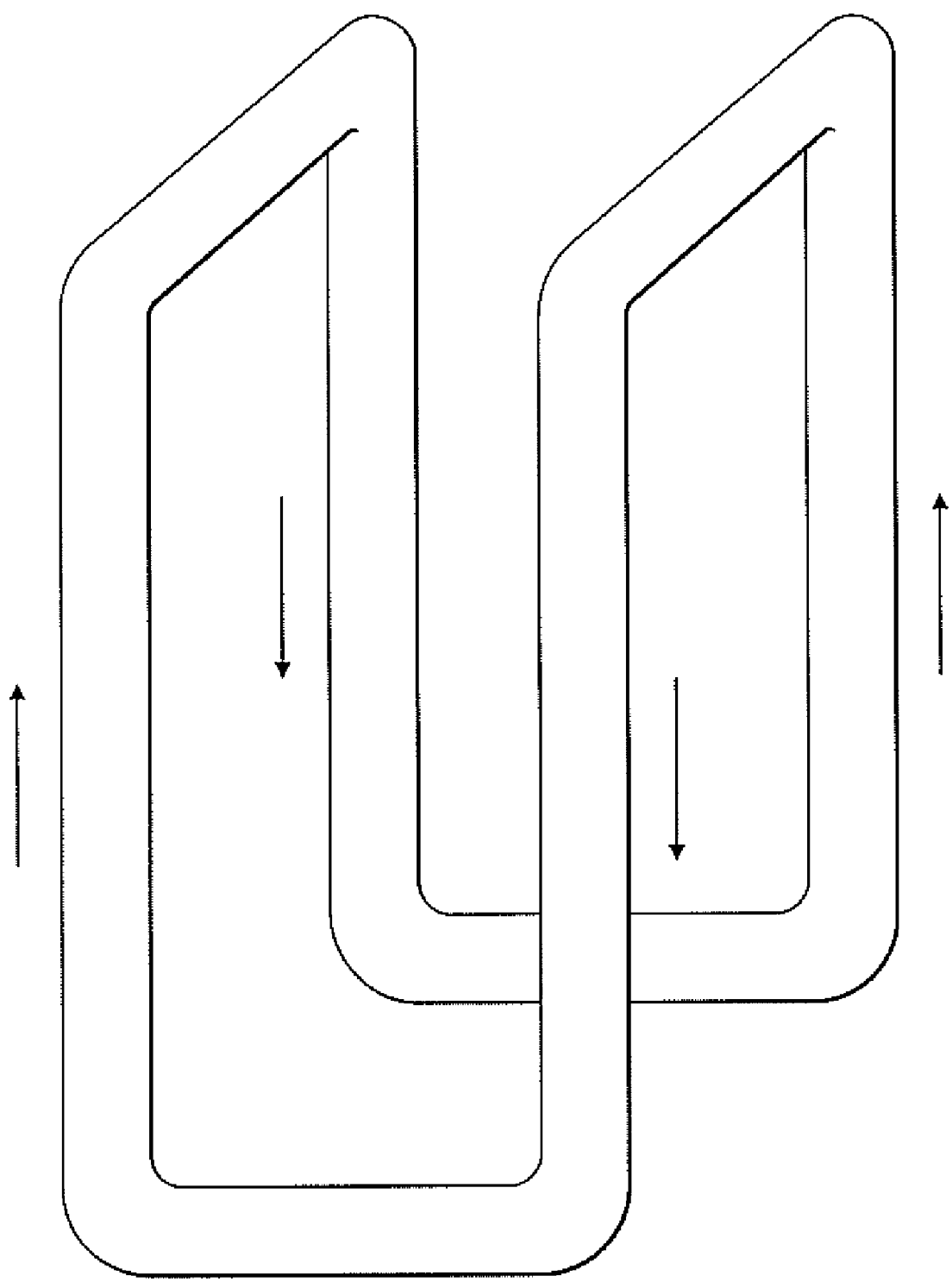
FIG. 1 is a reactor having four vertical legs.

For reactors having four vertical legs (such as shown in FIG. 1), it is preferred that the horizontal sections joining the bottoms of the legs are the same length or shorter than those joining the tops of the legs. For reactors having eight vertical legs, it is preferred that the horizontal sections joining the tops of the legs all have the same horizontal orientation. More generally, it is preferred that no more than four, preferably no more than two, horizontal sections joining the bottoms of the vertical legs of the loop reactor have the same horizontal orientation. Usually sections having the same horizontal orientation are parallel, although they need not be exactly so.

It is also generally preferred that the length to diameter ratio (L/D) of the horizontal sections in the loop reactor is no greater than 12, and separately it is preferred that the ratio of elbow radius to diameter in the reactor is no greater than 4.

It can be seen from the invention that it can be advantageous to carry out the polymerisation in larger diameter reactors than are conventionally used in slurry polymerisation, since this means that the CSD will be lower (since it is quoted as a proportion of the reactor diameter). For example, reactors having internal diameters over 500 millimeters, in particular over 600 for example between 600 and 750 millimeters can be used where historically there would have been increased concern.

Reactor size is typically over 20 m³ in particular over 50 m³ for example 75-150 m³ preferably in the range 75-150 m³.

The pressure employed in the loop will be sufficient to maintain the reaction system 'liquid full' i.e. there is substantially no gas phase. Typical pressures used are between 1-100 bara, preferably between 30 to 50 bara. In ethylene polymerization the ethylene partial pressure will typically be in the range 0.1 to 5 MPa, preferably from 0.2 to 2 MPa, more particularly from 0.4 to 1.5 MPa. The temperatures selected are such that substantially all of the polymer produced is essentially (i) in a non-tacky and non-agglomerative solid particular form and (ii) insoluble in the diluent. The polymerization temperature depends on the hydrocarbon diluent chosen and the polymer being produced. In ethylene polymerisation the temperature is generally below 130° C., typically between 50 and 125° C., preferably between 75 and 110° C. For example in ethylene polymerisation in isobutane diluent, the pressure employed in the loop is preferably in the range 30-50 bara, the ethylene partial pressure is preferably in the range 0.2-2 MPa and the polymerisation temperature is in the range 75-110° C. The space time yield which is production rate of polymer per unit of loop reactor volume for the process of the present invention is in the range 0.1-0.4 preferably 0.15-0.3 tonne/hour/m³.

The process according to the invention applies to the preparation of compositions containing olefin (preferably ethylene) polymers which can comprise one or a number of olefin homo-polymers and/or one or a number of copolymers. It is particularly suited to the manufacture of ethylene polymers and propylene polymers. Ethylene copolymers typically comprise an alpha-olefin in a variable amount which can reach 12% by weight, preferably from 0.5 to 6% by weight, for example approximately 1% by weight.

The alpha mono-olefin monomers generally employed in such reactions are one or more 1-olefins having up to 8 carbon atoms per molecule and no branching nearer the double bond than the 4-position. Typical examples include ethylene, propylene, butene-1, pentene-1, hexene-1 and octene-1, and mixtures such as ethylene and butene-1 or ethylene and hexene-1. Butene-1, pentene-1 and hexene-1 are particularly preferred comonomers for ethylene copolymerisation.

Typical diluents employed in such reactions include hydrocarbons having 2 to 12, preferably 3 to 8, carbon atoms per molecule, for example linear alkanes such as propane, n-butane, n-hexane and n-heptane, or branched alkanes such as isobutane, isopentane, toluene, isooctane and 2,2,-dimethylpropane, or cycloalkanes such as cyclopentane and cyclohexane or their mixtures. In the case of ethylene polymerization, the diluent is generally inert with respect to the catalyst, cocatalyst and polymer produced (such as liquid aliphatic, cycloaliphatic and aromatic hydrocarbons), at a temperature such that at least 50 wt % (preferably at least 70 wt % or even at least 90 wt %) of the polymer formed is insoluble therein. Isobutane is particularly preferred as the diluent for ethylene polymerisation. In the case of propylene polymerisation, it is possible to use the propylene monomer itself as a diluent.

The operating conditions can also be such that the monomers (e.g. ethylene, propylene) act as the diluent as is the case in so called bulk polymerisation processes. The slurry concentration limits in volume percent have been found to be able to be applied independently of molecular weight of the diluent and whether the diluent is inert or reactive, liquid or supercritical. Propylene monomer is particularly preferred as the diluent for propylene polymerisation Methods of molecular weight regulation are known in the art. When using Ziegler-Natta, metallocene and tridentate late transition metal type catalysts, hydrogen is preferably used, a higher hydrogen pressure resulting in a lower average molecular weight. When using chromium type catalysts, polymerization temperature is preferably used to regulate molecular weight.

In commercial plants, the particulate polymer is separated from the diluent in a manner such that the diluent is not exposed to contamination so as to permit recycle of the diluent to the polymerization zone with minimal if any purification. Separating the particulate polymer produced by the process of the present invention from the diluent typically can be by any method known in the art for example it can involve either (i) the use of discontinuous vertical settling legs such that the flow of slurry across the opening thereof provides a zone where the polymer particles can settle to some extent from the diluent or (ii) continuous product withdrawal via a single or multiple withdrawal ports, the location of which can be anywhere on the loop reactor but is preferably adjacent to the downstream end of a horizontal section of the loop. Any continuous withdrawal ports will typically have an internal diameter in the range 2-25, preferably 4-15, especially 5-10 cm. This invention permits large scale polymerisation reactors to be operated with low diluent recover requirements. The operation of reactors with high solids concentrations in the slurry minimises the quantity of the principal diluent withdrawn from the polymerisation loop. Use of concentrating devices on the withdrawn polymer slurry, preferably hydrocylones (single or in the case of multiple hydrocyclones in parallel or series), further enhances the recovery of diluent in an energy efficient manner since significant pressure reduction and vaporisation of recovered diluent is avoided.

The withdrawn, and preferably concentrated, polymer slurry is depressurised, and optionally heated, prior to introduction into a primary flash vessel. The stream is preferably heated after depressurisation.

The diluent and any monomer vapors recovered in the primary flash vessel are typically condensed, preferably without recompression and reused in the polymerization process. The pressure of the primary flash vessel is preferably controlled to enable condensation with a readily available cooling medium (e.g. cooling water) of essentially all of the flash vapour prior to any recompression, typically such pressure in said primary flash vessel will be 4-25, for example 6-15, preferably 6-12 bara. The solids recovered from the primary flash vessel is preferably passed to a secondary flash vessel to remove residual volatiles. Alternatively the slurry may be passed to a flash vessel of lower pressure than in the above mentioned primary vessel such that recompression needed to condense the recovered diluent. Use of a high pressure flash vessel is preferred.

The process according to the invention can be used to produce resins which exhibit specific density in the range 0.890 to 0.930 kg/m³ (low density), 0.930 to 0.940 kg/m³ (medium density) or 0.940 to 0.970 kg/m³ (high density).

The process according to the invention is relevant to all olefin polymerisation catalyst systems, particularly those chosen from the Ziegler-type catalysts, in particular those derived from titanium, zirconium or vanadium and from thermally activated silica or inorganic supported chromium oxide catalysts and from metallocene-type catalysts, metallocene being a cyclopentadienyl derivative of a transition metal, in particular of titanium or zirconium.

Non-limiting examples of Ziegler-type catalysts are the compounds comprising a transition metal chosen from groups IIIB, IVB, VB or VIB of the periodic table, magnesium and a halogen obtained by mixing a magnesium compound with a compound of the transition metal and a halogenated compound. The halogen can optionally form an integral part of the magnesium compound or of the transition metal compound.

Metallocene-type catalysts may be metallocenes activated by either an aluminoxane or by an ionising agent as described, for example, in Patent Application EP-500,944-A1 (Mitsui Toatsu Chemicals).

Ziegler-type catalysts are most preferred. Among these, particular examples include at least one transition metal chosen from groups IIIB, IVB, VB and VIB, magnesium and at least one halogen. Good results are obtained with those comprising:

from 10 to 30% by weight of transition metal, preferably from 15 to 20% by weight, from 20 to 60% by weight of halogen, the values from 30 to 50% by weight being preferred, from 0.5 to 20% by weight of magnesium, usually from 1 to 10% by weight, from 0.1 to 10% by weight of aluminium, generally from 0.5 to 5% by weight, the balance generally consists of elements arising from the products used for their manufacture, such as carbon, hydrogen and oxygen. The transition metal and the halogen are preferably titanium and chlorine.

Polymerisations, particularly Ziegler catalysed ones, are typically carried out in the presence of a cocatalyst. It is possible to use any cocatalyst known in the art, especially compounds comprising at least one aluminium-carbon chemical bond, such as optionally halogenated organoaluminium compounds, which can comprise oxygen or an element from group I of the periodic table, and aluminoxanes. Particular examples would be organoaluminium compounds, of trialkylaluminiums such as triethylaluminium, trialkenylaluminiums such as triisopropenylaluminium, aluminium mono- and dialkoxides such as diethylaluminium ethoxide, mono- and dihalogenated alkylaluminiums such as diethylaluminium chloride, alkylaluminium mono- and dihydrides such as dibutylaluminium hydride and organoaluminium compounds comprising lithium such as $LiAl(C_2H_5)_4$. organoaluminium compounds, especially those which are not halogenated, are well suited. Triethylaluminium and triisobutylaluminium are especially advantageous.

The chromium-based catalyst is preferred to comprise a supported chromium oxide catalyst on a support, the support usually being titania-containing—such as for example a composite silica and titania support. A particularly preferred chromium-based catalyst may comprise from 0.5 to 5 wt % chromium, preferably around 1 wt % chromium, such as 0.9 wt % chromium based on the weight of the chromium-containing catalyst. The support comprises at least 2 wt % titanium, preferably around 2 to 3 wt % titanium, more preferably around 2.3 wt % titanium based on the weight of the chromium containing catalyst. The chromium-based catalyst may have a specific surface area of from 200 to 700 $m^2/g$, preferably from 400 to 550 $m^2/g$ and a volume porosity of greater than 2 $cm^3/g$ preferably from 2 to 3 $cm^3/g$.

Silica supported chromium catalysts are typically subjected to an initial activation step in air at an elevated activation temperature. The activation temperature preferably ranges from 500 to 850° C., more preferably 600 to 850° C.

The reactor loop can be used to make monomodal or multimodal, for example bimodal, polymers. The multi-modal polymers can be made in a single reactor or in multiple reactors. The reactor system can comprise one or more loop reactors connected in series or in parallel. The reactor loop may also be preceded or followed by a polymerisation reactor that is not a loop reactor.

Figure 2:
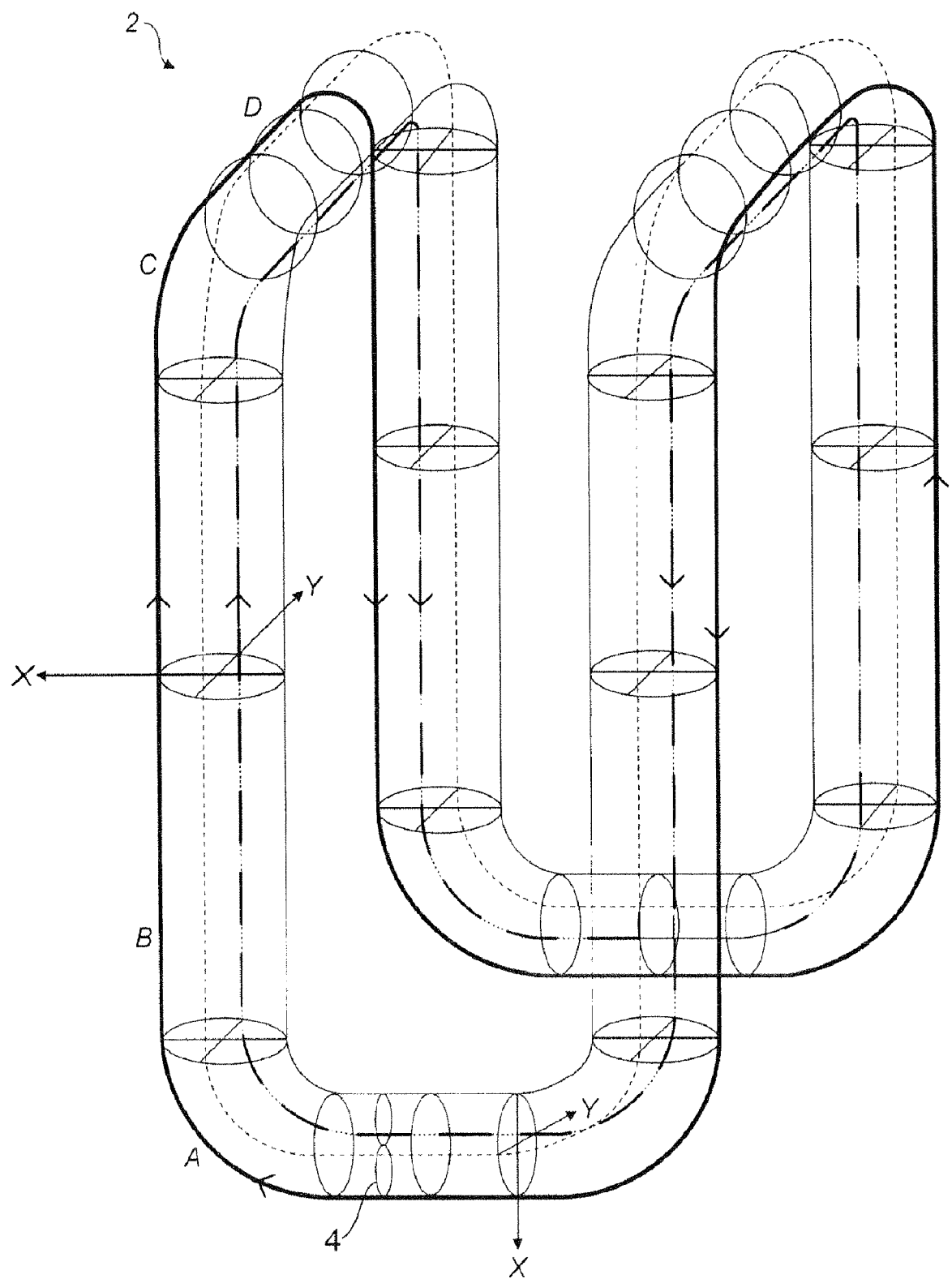
FIG. 2 is a further representation of the reactor of FIG. 1.
Figure 3:
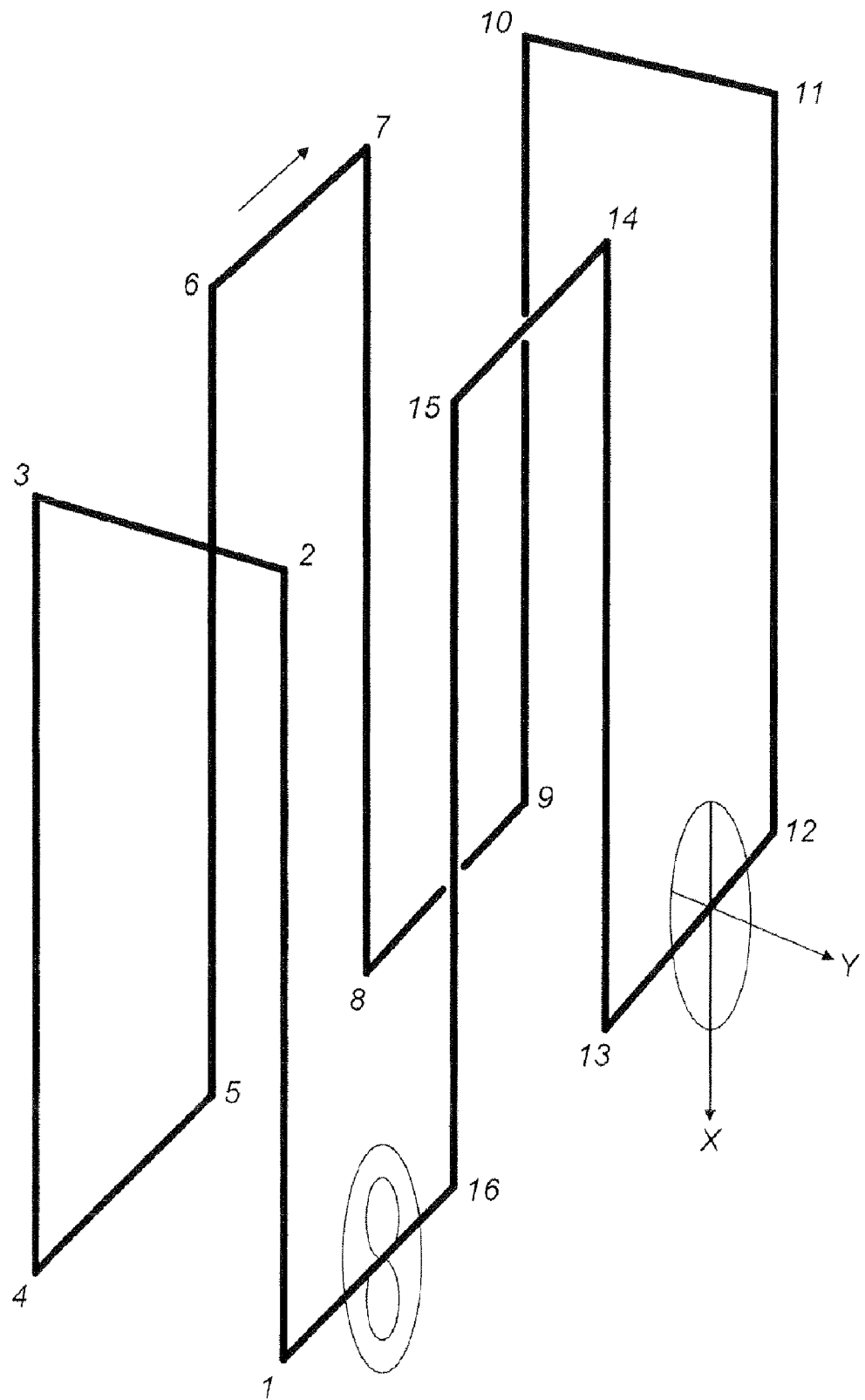
FIG. 3 is a schematic representation of a reactor having eight vertical legs.

The invention will now be illustrated by reference to the following examples with reference to the accompanying drawings, in which FIG. 1 shows a typical loop reactor, FIG. 2 shows the reactor of FIG. 1 in diagrammatic form, FIG. 3 shows in diagrammatic form a specific geometry for the type of reactor of FIG. 1, and FIG. 3 shows in diagrammatic form an alternative geometry for the type of reactor of FIG. 1.

FIG. 1 shows a typical loop reactor of a simple design. It comprises four vertical legs connected by four horizontal sections, with eight elbows. There is a single pump, which means that cumulative settling distance is calculated for a complete circuit of the reactor. In the vertical legs the net movement towards the reactor wall is zero. Therefore in order to calculate the cumulative settling distance (CSD), twelve sections—comprising all eight elbows and the four horizontal portions—need to be considered.

FIG. 2 shows the reactor of FIG. 1 diagramatically, with a pair of perpendicular directions X and Y towards the reactor wall marked, and longitudinal axes corresponding to each of those directions indicated around the full length of the reactor. The cumulative settling distance (CSD) is determined along these two longitudinal axes. The CSD for the corresponding longitudinal axis on the opposite side of the pipe will of course be the same but in the opposite direction.

Thus for both longitudinal axes, the settling distance has to be determined in each of the twelve sections mentioned above, with the CSD being the sum of those values. The direction of settling in each section can be seen from examination of the diagram, as described below.

Considering the longitudinal axes corresponding to directions X and Y, starting from pump 4 the slurry moves in the direction of elbow A. In the initial horizontal passage, gravitational forces cause the particles in the slurry to settle in the direction X, which in this part of the reactor is pointing downwards. Motion relative to direction Y is zero. In the elbow A, centifugal forces again urge the slurry in the direction of X, which at this point is on the outside of the bend. Again motion relative to direction Y is zero. In the vertical section B, as in all vertical sections, relative motion in all directions towards the reactor wall is zero. At elbow C, centifugal forces urge the slurry away from the direction of Y—which is on the inside of this bend—whilst direction X is on the side of the bend so that relative motion in this direction is zero. In horizontal section D, direction X remains on the side whilst Y is on the underside of the pipe, so that the gravitational settling motion is towards Y.

The above analysis can be continued around the entire circuit of the reactor. It can be seen that in some sections motion is towards X or Y, whilst in other sections it is either neutral or away. The amount of motion (settling distance) in each section in any direction is calculated according to the formulae previously described, and the net motion (cumulative settling distance) at each point over the whole circuit determined by adding results for each section.

EXAMPLE 1

Comparative

This Example provides a calculation of cumulative settling distance for an ethylene polymerisation carried out in isobutane in a loop reactor with eight vertical legs, and having the configuration shown diagrammatically in FIG. 3. The reactor has a single pump, and therefore the cumulative settling distance is calculated over one complete circuit of the reactor, starting at the pump.

The process conditions for the polymerisation are shown in Table 1. The polymer is polyethylene, and the diluent is isobutane. In this case the solids concentration is 35 vol %.

TABLE 1

|  | Units |  |
|---|---|---|
| Reactor diameter | m | 0.7 |
| Number of vertical legs |  | 8 |
| Length of horizontal sections | m | 7 |
| Number of horizontal sections |  | 8 |
| Number of elbows |  | 16 |
| Elbow radius of curvature | m | 2.1 |
| Reactor circulation velocity | m/s | 9 |
| Solids volume concentration | % | 35 |
| Density of fluid | kg/m$^3$ | 430 |
| Bulk density of packed particles | kg/m$^3$ | 475 |
| Apparent density of particles | kg/m$^3$ | 800 |
| Maximum geometric volume conc | % | 59.38 |
| Solids volume concentration ratio |  | 0.59 |
| Gravitational acceleration | m/s$^2$ | 9.81 |
| Centrifugal acceleration |  | 38.57 |
| Particle diameter (average) | micron | 500 |

It is first necessary to select two perpendicular radial directions along which the cumulative settling distance is to be calculated. The invention requires the cumulative settling distance (CSD) in any direction to be below a particular limit, and therefore the two directions are chosen so as to ensure the maximum possible CSD is determined. For this reason one of the directions must be vertically up or down when the axis of the reactor is horizontal, and the other direction horizontal. The two directions are shown as X and Y in FIG. 3.

Table 2 shows the basis for the calculation of cumulative settling distance for this reactor. It shows data for one horizontal section 7.0 m in length, and also for one elbow whose curved length is 3.3 m.

The horizontal settling velocity $V_{hs}$ is calculated according to the formula $V_{cs} = 1.74 * (d*(Rho_p - Rho_f)/Rho_f * g)^{0.5}$ where $d = 500$ μm, $Rho_p = 800$ kg/m$^3$ and $Rho_f = 430$ kg/m$^3$. This is then corrected for concentration effects by multiplying it by $(1 - C_{vol})^{2.33}$ where $C_{vol}$ is the volumetric concentration of the slurry expressed as a fraction, in this case 0.3.

The centrifugal settling velocity $V_{cs}$ is calculated according to the formula $V_{cs} = 1.74 * (d*(Rho_p - Rho_f)/Rho_f * V^2 / R_{elbow})^{0.5}$, where V is the reactor circulation velocity and $R_{elbow}$ is the radius of curvature of the elbow. In the elbow, horizontal settling due to gravitational forces is ignored.

Once the settling velocities are calculated, it is easy to calculate the settling distance in each section by determining the time spent in each section (length of section divided by reactor circulation velocity). This is then expressed as a fraction of the diameter. In the horizontal and elbow sections below, this fraction is 0.045 and 0.043 (4.5 and 4.3%) respectively.

TABLE 2

| Horizontal settling velocity $V_{hs}$ | m/s | 0.113 |
|---|---|---|
| $V_{hs}$ corrected for concentration effects | m/s | 0.041 |
| Horizontal length of settling | m | 7 |
| Settling time in horizontal section | s | 0.778 |
| Settling distance in horizontal section | m | 0.032 |
| Settling distance ratio (rel to diameter) |  | 0.045 |
| Centrifugal settling velocity $V_{cs}$ | m/s | 0.224 |
| $V_{cs}$ corrected for concentration effects | m/s | 0.082 |
| Centrifugal length of elbow section | m | 3.299 |
| Settling time in elbow section | s | 0.367 |
| Settling distance in elbow section | m | 0.030 |
| Settling distance ratio (rel to diameter) |  | 0.043 |

The above calculation is repeated for all horizontal sections and all elbows (obviously if the lengths are the same, the calculation will be the same). The calculated settling distance for each section is then applied to directions X and Y—either as a positive number (towards the wall), negative number (away from the wall), or zero (no net movement). Finally the values for each section are added up to give the cumulative settling distance.

Table 3 below shows the cumulative settling distance in both X and Y directions around a full circuit of the reactor starting from the pump. The numbers refer to each successive elbow as shown in FIG. 3: V is a vertical section between elbows, and H is a horizontal section between elbows. In the settling direction for each axis, a+ indicates movement towards the wall, a− indicates movement away from the wall, and 0 indicates no net movement. As shown in Table 2, the settling distance in a horizontal section is 0.043 m, and that in an elbow is 0.040 m.

TABLE 3

| Section | X axis | Settling distance (m) | Cumulative settling distance (m) - X | Y axis | Settling distance (m) | Cumulative settling distance (m) - Y |
|---|---|---|---|---|---|---|
| 1 | + | +0.030 | 0.030 | 0 | 0 | 0.000 |
| V | 0 | 0 | 0.030 | 0 | 0 | 0.000 |
| 2 | 0 | 0 | 0.030 | + | +0.030 | 0.030 |
| H | 0 | 0 | 0.030 | − | −0.032 | −0.002 |
| 3 | 0 | 0 | 0.030 | + | +0.030 | 0.028 |
| V | 0 | 0 | 0.030 | 0 | 0 | 0.028 |
| 4 | + | +0.030 | 0.060 | 0 | 0 | 0.028 |
| H | + | +0.032 | 0.092 | 0 | 0 | 0.028 |
| 5 | + | +0.030 | 0.122 | 0 | 0 | 0.028 |
| V | 0 | 0 | 0.122 | 0 | 0 | 0.028 |
| 6 | − | −0.030 | 0.092 | 0 | 0 | 0.028 |
| H | 1 | +0.032 | 0.124 | 0 | 0 | 0.028 |
| 7 | − | −0.030 | 0.104 | 0 | 0 | 0.028 |
| V | 0 | 0 | 0.104 | 0 | 0 | 0.028 |
| 8 | + | +0.030 | 0.134 | 0 | 0 | 0.028 |
| H | + | +0.032 | 0.166 | 0 | 0 | 0.028 |
| 9 | + | +0.030 | 0.196 | 0 | 0 | 0.028 |
| V | 0 | 0 | 0.196 | 0 | 0 | 0.028 |
| 10 | 0 | 0 | 0.196 | + | +0.030 | 0.058 |
| H | 0 | 0 | 0.196 | − | −0.032 | 0.026 |
| 11 | 0 | 0 | 0.196 | + | +0.030 | 0.056 |
| V | 0 | 0 | 0.196 | 0 | 0 | 0.056 |
| 12 | + | +0.030 | 0.226 | 0 | 0 | 0.056 |
| H | + | +0.032 | 0.258 | 0 | 0 | 0.056 |
| 13 | + | +0.030 | 0.288 | 0 | 0 | 0.056 |
| V | 0 | 0 | 0.288 | 0 | 0 | 0.056 |
| 14 | − | −0.030 | 0.258 | 0 | 0 | 0.056 |
| H | + | +0.032 | 0.290 | 0 | 0 | 0.056 |
| 15 | − | −0.030 | 0.260 | 0 | 0 | 0.056 |
| V | 0 | 0 | 0.260 | 0 | 0 | 0.056 |
| 16 | + | +0.030 | 0.290 | 0 | 0 | 0.056 |
| H | + | +0.032 | 0.322 | 0 | 0 | 0.056 |
|  | Maximum CSD |  | 0.322 | Maximum CSD |  | 0.058 |
|  | Max CSD as fraction |  | 0.46 | Max CSD as fraction |  | 0.08 |

The above table shows that in the vertical direction X the cumulative settling distance mostly increases during the circuit of the reactor, with only a small number of decreases at certain elbows. The maximum CSD occurs at the end of the circuit. By contrast, in the horizontal direction Y the settling effects are mostly neutral, with increases at just four elbows and decreases in two horizontal sections. The maximum CSD actually occurs midway around the reactor, and is slightly lower by the end of the circuit.

The first aspect of the invention is only applicable when the SVCR is greater than (9*0.065)=0.58. In this case it is 0.59. The both aspects the invention requires that the ratio of the cumulative settling distance at any point in the reactor in any direction perpendicular to the direction of the flow, to the diameter of the loop reactor, CSD, is maintained below the lower of 0.37 or ((0.084*2.38)+(0.69−SVCR)*1.666). In the second aspect of the invention this ratio must in any case be below 0.37. In the above case SVCR is 0.59, which gives a value of (0.200+(0.69−0.59)*1.666)=0.366. In the case above it can be seen that the maximum CSD expressed as a fraction of the diameter is 0.46, and therefore this arrangement does not satisfy the requirements of the invention.

EXAMPLE 2

Figure 4:
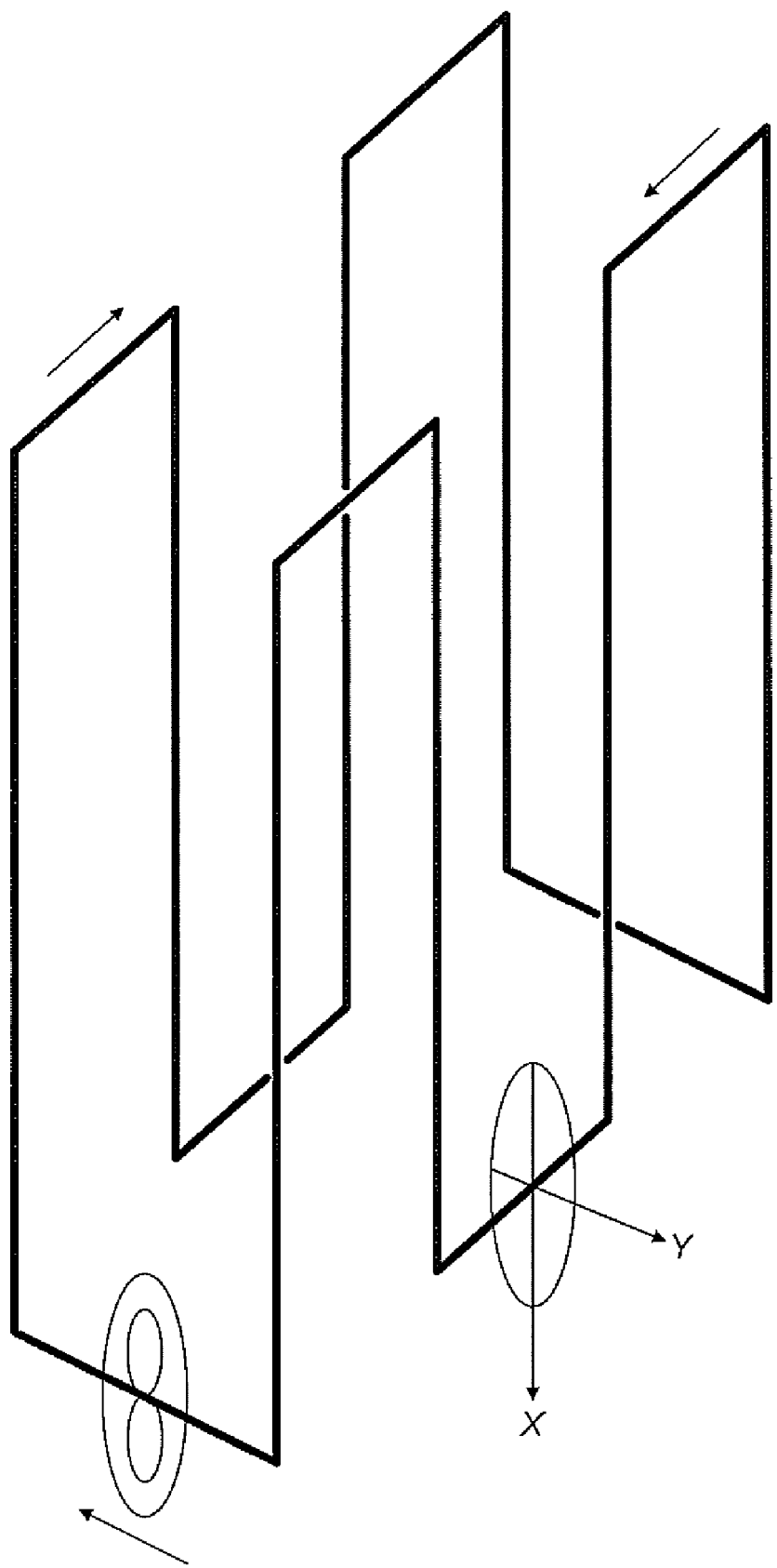
FIG. 4 is an alternative schematic representation of a reactor having eight vertical legs.

This Example shows operation of the same process in a similar loop reactor having the same overall volume, shown in FIG. 4. There are still eight vertical legs, with 7 m horizontal sections between them and 16 elbows, but as can be seen from FIG. 4 this reactor has a slightly different geometry (is is actually the reactor of FIG. 3 turned upside down).

All the calculations shown in Tables 1 and 2 for Example 1 are identical for this reactor. However because of the different geometry, the buildup of the cumulative settling distance is different, and is shown in Table 4 below.

TABLE 4

| Section | X axis | Settling distance (m) | Cumulative settling distance (m) - X | Y axis | Settling distance (m) | Cumulative settling distance (m) - Y |
|---|---|---|---|---|---|---|
| 1 | + | +0.030 | 0.030 | 0 | 0 | 0.000 |
| V | 0 | 0 | 0.030 | 0 | 0 | 0.000 |
| 2 | 0 | 0 | 0.030 | − | −0.030 | −0.030 |
| H | 0 | 0 | 0.030 | + | +0.032 | 0.002 |
| 3 | 0 | 0 | 0.030 | − | −0.030 | −0.028 |
| V | 0 | 0 | 0.030 | 0 | 0 | −0.028 |
| 4 | 0 | 0 | 0.030 | + | +0.030 | 0.002 |
| H | 0 | 0 | 0.030 | + | +0.032 | 0.034 |
| 5 | 0 | 0 | 0.030 | + | +0.030 | 0.064 |
| V | 0 | 0 | 0.030 | 0 | 0 | 0.064 |
| 6 | 0 | 0 | 0.030 | − | −0.030 | 0.034 |
| H | 0 | 0 | 0.030 | + | +0.032 | 0.066 |
| 7 | 0 | 0 | 0.030 | − | −0.030 | 0.036 |
| V | 0 | 0 | 0.030 | 0 | 0 | 0.036 |
| 8 | + | +0.030 | 0.060 | 0 | 0 | 0.036 |
| H | + | +0.032 | 0.092 | 0 | 0 | 0.036 |
| 9 | + | +0.030 | 0.122 | 0 | 0 | 0.036 |
| V | 0 | 0 | 0.122 | 0 | 0 | 0.036 |
| 10 | 0 | 0 | 0.122 | − | −0.030 | 0.006 |
| H | 0 | 0 | 0.122 | + | +0.032 | 0.038 |
| 11 | 0 | 0 | 0.122 | − | −0.030 | 0.008 |
| V | 0 | 0 | 0.122 | 0 | 0 | 0.008 |
| 12 | 0 | 0 | 0.122 | + | +0.030 | 0.038 |
| H | 0 | 0 | 0.122 | + | +0.032 | 0.070 |
| 13 | 0 | 0 | 0.122 | + | +0.030 | 0.100 |
| V | 0 | 0 | 0.122 | 0 | 0 | 0.100 |
| 14 | 0 | 0 | 0.122 | − | −0.030 | 0.070 |
| H | 0 | 0 | 0.122 | + | +0.032 | 0.102 |
| 15 | 0 | 0 | 0.122 | − | −0.030 | 0.072 |
| V | 0 | 0 | 0.122 | 0 | 0 | 0.072 |
| 16 | + | +0.030 | 0.152 | 0 | 0 | 0.072 |
| H | + | +0.032 | 0.184 | 0 | 0 | 0.072 |
| Maximum CSD | | | 0.184 | Maximum CSD | | 0.102 |
| Max CSD as fraction | | | 0.26 | Max CSD as fraction | | 0.15 |

Here it can be seen that at 0.184 m in the X direction, the maximum CSD is significantly less than that in Example 1, despite the reactor being the same size with the same number of vertical legs, and of essentially the same design. Thus it can be seen how careful attention to the design of the reactor geometry can make a significant difference to the degree of settling which occurs. As mentioned in connection with Example 1, in order to satisfy the second aspect of the invention, the maximum CSD expressed as a fraction must be maintained below the smaller of 0.37 and 0.46. Thus it can be seen that this Example is inside the second aspect of the invention, although not applicable to the first aspect.

The following Examples are based on reactors of a similar design to those in FIGS. 3 and 4, but with different numbers of vertical legs, and with processes having different circulation velocities. In these Examples only the maximum cumulative settling distance is shown, but additionally data is shown relating to the concentration profile of the slurry as a result of the settling.

EXAMPLE 3

Comparative

This Example is based on a reactor having six vertical legs joined by six horizontal sections. The reactor has a single pump in a horizontal section. The slurry circulation velocity is 6 m/s.

TABLE 5

| | Units | |
|---|---|---|
| Reactor diameter | m | 0.61 |
| Number of vertical legs | | 6 |
| Length of horizontal sections | m | 7 |
| Number of horizontal sections | | 6 |
| Number of elbows | | 12 |
| Elbow radius of curvature | m | 2.4 |
| Reactor circulation velocity V | m/s | 6 |
| Solids volume concentration | % | 30 |
| Density of fluid | $kg/m^3$ | 430 |
| Bulk density of packed particles | $kg/m^3$ | 475 |
| Apparent density of particles | $kg/m^3$ | 800 |
| Maximum geometric volume conc | % | 59.38 |
| Solids volume concentration ratio | | 0.50 |
| Gravitational acceleration | $m/s^2$ | 9.81 |
| Centrifugal acceleration | | 14.75 |
| Particle diameter (average) | micron | 500 |

Application of the principles outlined previously shows that the maximum cumulative settling distance (in direction Y in FIG. 1) comprises the contribution of two horizontal legs and four elbows. In the table below, the length of the two horizontal sections and four elbow sections are totalled for the whole reactor, and thus the settling distances are cumulative. This assumes that the maximum cumulative settling distance occurs at the end of the circuit, just before the pump.

TABLE 6

| | | |
|---|---|---|
| Horizontal settling velocity $V_{hs}$ | m/s | 0.113 |
| $V_{hs}$ corrected for concentration effects | m/s | 0.049 |
| Cumulative horizontal length of settling | m | 14 |
| Total settling time in horizontal sections | s | 2.333 |
| Total settling distance in horizontal sections | m | 0.115 |
| Cumulative horizontal settling distance ratio | | 0.19 |
| Centrifugal settling velocity $V_{cs}$ | m/s | 0.139 |
| $V_{cs}$ corrected for concentration effects | m/s | 0.060 |
| Cumulative centrifugal length of elbow sections | m | 15.33 |
| Total settling time in elbow sections | s | 2.555 |
| Total settling distance in elbow sections | m | 0.154 |
| Cumulative centrifugal settling distance ratio | | 0.25 |
| Overall cumulative settling distance ratio CSD | | 0.44 |
| 0.084 * (V − 6.62) + (0.69 − SVCR) * 1.666 | | 0.26 |

It can be seen from Table 6 that the overall cumulative settling distance ratio CSD is 0.44, which outside the requirement of the present invention that it should be below 0.26.

EXAMPLE 4

According to the Invention

This Example is the same as Example 3, except that the diluent is 1-hexane (density 600 kg/m$^3$) instead of isobutane (density 430 kg/m$^3$), and the distance between the vertical legs is 7.6 m rather than 7 m. The average particle diameter when hexane is the diluent is about 250 microns rather than 500 microns.

TABLE 7

| | Units | |
|---|---|---|
| Reactor diameter | m | 0.61 |
| Number of vertical legs | | 6 |
| Length of horizontal sections | m | 7 |
| Number of horizontal sections | | 6 |
| Number of elbows | | 12 |
| Elbow radius of curvature | m | 2.4 |
| Reactor circulation velocity V | m/s | 6 |
| Solids volume concentration | % | 30 |
| Density of fluid | kg/m$^3$ | 600 |
| Bulk density of packed particles | kg/m$^3$ | 475 |
| Apparent density of particles | kg/m$^3$ | 800 |
| Maximum geometric volume conc | % | 59.38 |
| Solids volume concentration ratio | | 0.50 |
| Gravitational acceleration | m/s$^2$ | 9.81 |
| Centrifugal acceleration | | 14.75 |
| Particle diameter (average) | micron | 250 |

Application of the principles outlined previously shows that the maximum cumulative settling distance (in direction Y in FIG. 1) comprises the contribution of two horizontal legs and four elbows. In the table below, the length of the two horizontal sections and four elbow sections are totalled for the whole reactor, and thus the settling distances are cumulative. This assumes that the maximum cumulative settling distance occurs at the end of the circuit, just before the pump.

TABLE 8

| | | |
|---|---|---|
| Horizontal settling velocity $V_{hs}$ | m/s | 0.050 |
| $V_{hs}$ corrected for concentration effects | m/s | 0.022 |
| Cumulative horizontal length of settling | m | 15.2 |
| Total settling time in horizontal sections | s | 2.533 |
| Total settling distance in horizontal sections | m | 0.055 |
| Cumulative horizontal settling distance ratio | | 0.09 |
| Centrifugal settling velocity $V_{cs}$ | m/s | 0.061 |
| $V_{cs}$ corrected for concentration effects | m/s | 0.027 |

TABLE 8-continued

| | | |
|---|---|---|
| Cumulative centrifugal length of elbow sections | m | 15.33 |
| Total settling time in elbow sections | s | 2.555 |
| Total settling distance in elbow sections | m | 0.068 |
| Cumulative centrifugal settling distance ratio | | 0.11 |
| Overall cumulative settling distance ratio CSD | | 0.20 |
| 0.084 * (V − 6.62) + (0.69 − SVCR) * 1.666 | | 0.26 |

It can be seen that in this Example, despite the slightly greater length of the horizontal sections, which has the effect of increasing the cumulative settling distance ratio CSD, the higher density of the diluent results in an overall CSD of 0.20, or less than half that of Example 4, and below the level of 0.26 which is required for the invention. This shows the benefit of a heavier diluent.

EXAMPLE 5

According to the Invention

This Example is based on a reactor having four vertical legs joined by four horizontal sections as shown in FIG. 1, and in which the elbows have a relatively small radius of curvature. The reactor has a single pump in a horizontal section. The slurry circulation velocity is 8.7 m/s.

TABLE 9

| | Units | |
|---|---|---|
| Reactor diameter | m | 0.61 |
| Number of vertical legs | | 4 |
| Length of horizontal sections | m | 7.6 |
| Number of horizontal sections | | 4 |
| Number of elbows | | 8 |
| Elbow radius of curvature | m | 1.4 |
| Reactor circulation velocity V | m/s | 8.7 |
| Solids volume concentration | % | 33 |
| Density of fluid | kg/m$^3$ | 430 |
| Bulk density of packed particles | kg/m$^3$ | 475 |
| Apparent density of particles | kg/m$^3$ | 800 |
| Maximum geometric volume conc | % | 59.38 |
| Solids volume concentration ratio SVCR | | 0.56 |
| Gravitational acceleration | m/s$^2$ | 9.81 |
| Centrifugal acceleration | | 62.04 |
| Particle diameter (average) | micron | 500 |

Application of the principles outlined previously shows that the maximum cumulative settling distance (in direction X in FIG. 1) comprises the contribution of two horizontal legs and four elbows. In the table below, the length of the two horizontal sections and four elbow sections are totalled for the whole reactor, and thus the settling distances are cumulative. This assumes that the maximum cumulative settling distance occurs at the end of the circuit, just before the pump.

TABLE 10

| | | |
|---|---|---|
| Horizontal settling velocity $V_{hs}$ | m/s | 0.113 |
| $V_{hs}$ corrected for concentration effects | m/s | 0.049 |
| Cumulative horizontal length of settling | m | 15.2 |
| Total settling time in horizontal sections | s | 1.747 |
| Total settling distance in horizontal sections | m | 0.086 |
| Cumulative horizontal settling distance ratio | | 0.14 |
| Centrifugal settling velocity $V_{cs}$ | m/s | 0.284 |
| $V_{cs}$ corrected for concentration effects | m/s | 0.124 |
| Cumulative centrifugal length of elbow sections | m | 7.666 |
| Total settling time in elbow sections | s | 0.881 |
| Total settling distance in elbow sections | m | 0.109 |

TABLE 10-continued

| | |
|---|---|
| Cumulative centrifugal settling distance ratio | 0.18 |
| Overall cumulative settling distance ratio | 0.32 |
| 0.084 * (V − 6.62) + (0.69 − SVCR) * 1.666 | 0.39 |

It can be seen from Table 10 that the overall cumulative settling distance ratio CSD is 0.32, which is inside the requirement of the second aspect of the present invention that it be below the lower of 0.35 or 0.39 (for a circulation velocity of 8.7 m/s and a solids volume concentration ratio SVCR of 0.56).

From the cumulative settling distance ratio, it is possible to calculate an approximate concentration profile for the slurry in its passage around the reactor, and thereby obtain an estimate of the thickness of areas of high concentration. Settling towards the wall ultimately causes a buildup of settled particles on the wall, and the greater the cumulative settling distance the greater the thickness of the layer of particles. As previously mentioned, the formation of areas of high concentration or settled particles close to the reactor wall can lead to various disadvantages such as fluctuations in reactor pressure drop and pump power requirements. It has previously been stated that the slurry circulation in the reactor tends to suffer from such problems if the ratio of the actual volumetric solids concentration to the maximum geometrical concentration, SVCR. exceeds 0.6.

It has been found that such issues generally become a problem once the thickness of the layer of settled particles exceeds 0.5D where D is the reactor diameter.

For the sake of simplicity, it has been assumed that the settling occurs uniformly, with all particles moving x% of the cumulative settling distance ratio in the settling direction every x% of the "settling length" between two pumps, which are the two points between which the cumulative settling distance is determined, regardless of the geometry of the reactor. Of course no settling occurs in the vertical legs of the reactor, and therefore the "settling length" refers only to those portions of the reactor where settling occurs, as in Tables 3 and 4. It is of course possible to do a more sophisticated analysis taking into account the geometry of each section of the reactor as in Tables 3 and 4, but this simplified calculation gives an indication of whether the combination of cumulative settling distance and solids concentration is likely to cause problems.

In Table 6 below, the solids concentration volume ratio, SVCR, is given for locations every 10% along the "settling length" of the reactor in ten equal sections across the cross-section of the reactor in the direction of net settling. It is assumed in this case that the amount of settling at each location along the length of the reactor is 10% of the cumulative settling distance, or 0.032D. The starting SVCR is 0.56 uniformly across the entire cross-section of the reactor.

After 10% of the reactor "settling length", the particles are all assumed to have moved 0.032D in the settling direction, or 10% of the total cumulative settling distance. At this point therefore, it can be considered that the 0.032D or 3.2% of the reactor cross-section furthest from the direction of settling has effectively been emptied of particles, whilst on the opposite side of the reactor the same proportion of particles has accumulated against the reactor wall. If one imagines the consequent concentration profile, one can see that the first 10% of the reactor cross-section furthest from the direction of settling contains no particles in the 32% closest to the reactor wall, meaning that its SVCR has dropped by 32% from 0.56 to 0.38. Meanwhile the 10% of the reactor cross-section closest to the direction of settling has accumulated the same number of additional particles, meaning that its SVCR has risen by 32% from 0.57 to 0.74.

In the next 10% of the "settling length" the process is repeated, with the particles moving another 0.032D in the settling direction, and so on along the length of the reactor. Thus it can be seen that there is a continuing accumulation of particles at the reactor wall in the direction of settling, and in Table 6 the solids volume concentration ratio reaches 1.0, ie the maximum possible, at 30% of the way round the length of the reactor. However as explained above, operational problems generally only occur if the thickness of the layer of settled particles (ie SVCR=1.0) exceeds 0.5D. In the Example below, it never exceeds 0.4D, and therefore this combination of reactor geometry and solids concentration would not be expected to cause problems. This shows the benefit of the invention.

TABLE 11 solids volume concentration ratio SVCR

| X-sections | Distance along length of reactor in direction of flow (%) | | | | | | | | | | |
|---|---|---|---|---|---|---|---|---|---|---|---|
| | 0 | 10 | 20 | 30 | 40 | 50 | 60 | 70 | 80 | 90 | 100 |
| 0-10 | 0.56 | 0.38 | 0.20 | 0.02 | 0.00 | 0.00 | 0.00 | 0.00 | 0.00 | 0.00 | 0.00 |
| 11-20 | 0.56 | 0.56 | 0.56 | 0.56 | 0.40 | 0.22 | 0.04 | 0.00 | 0.00 | 0.00 | 0.00 |
| 21-30 | 0.56 | 0.56 | 0.56 | 0.56 | 0.56 | 0.56 | 0.56 | 0.43 | 0.25 | 0.07 | 0.00 |
| 31-40 | 0.56 | 0.56 | 0.56 | 0.56 | 0.56 | 0.56 | 0.56 | 0.56 | 0.56 | 0.56 | 0.45 |
| 41-50 | 0.56 | 0.56 | 0.56 | 0.56 | 0.56 | 0.56 | 0.56 | 0.56 | 0.56 | 0.56 | 0.56 |
| 51-60 | 0.56 | 0.56 | 0.56 | 0.56 | 0.56 | 0.56 | 0.56 | 0.56 | 0.56 | 0.56 | 0.58 |
| 61-70 | 0.56 | 0.56 | 0.56 | 0.56 | 0.56 | 0.56 | 0.56 | 0.56 | 0.67 | 0.85 | 1.00 |
| 71-80 | 0.56 | 0.56 | 0.56 | 0.56 | 0.56 | 0.57 | 0.75 | 0.93 | 1.00 | 1.00 | 1.00 |
| 81-90 | 0.56 | 0.56 | 0.56 | 0.66 | 0.83 | 1.00 | 1.00 | 1.00 | 1.00 | 1.00 | 1.00 |
| 91-100 | 0.57 | 0.74 | 0.92 | 1.00 | 1.00 | 1.00 | 1.00 | 1.00 | 1.00 | 1.00 | 1.00 |

EXAMPLE 6

Comparative

This Example is for a reactor having 8 legs in the configuration shown in FIG. 3.

TABLE 12

| | Units | |
|---|---|---|
| Reactor diameter | m | 0.7 |
| Number of vertical legs | | 8 |
| Length of horizontal sections | m | 7.5 |
| Number of horizontal sections | | 8 |
| Number of elbows | | 16 |

TABLE 12-continued

|  | Units |  |
| --- | --- | --- |
| Elbow radius of curvature | m | 2.4 |
| Reactor circulation velocity V | m/s | 9 |
| Solids volume concentration | % | 30 |
| Density of fluid | kg/m³ | 430 |
| Bulk density of packed particles | kg/m³ | 475 |
| Apparent density of particles | kg/m³ | 900 |
| Maximum geometric volume conc | % | 52.78 |

TABLE 12-continued

|  | Units |  |
| --- | --- | --- |
| Solids volume concentration ratio |  | 0.57 |
| Gravitational acceleration | m/s² | 9.81 |
| Centrifugal acceleration |  | 28.93 |
| Particle diameter (average) | micron | 500 |

Application of the principles outlined previously shows that the maximum cumulative settling distance (in direction X in FIG. 3) comprises the contribution of six horizontal legs and four elbows, as was the case with the identical geometry of Example 1. It should be noted that in this Example the length of the horizontal sections and elbows is slightly greater than in Example 1, and the apparent density of the particles is greater.

TABLE 13

| Horizontal settling velocity $V_{hs}$ | m/s | 0.127 |
| --- | --- | --- |
| $V_{hs}$ corrected for concentration effects | m/s | 0.055 |
| Cumulative horizontal length of settling | m | 45 |
| Total settling time in horizontal sections | s | 5.000 |
| Total settling distance in horizontal sections | m | 0.277 |
| Cumulative horizontal settling distance ratio |  | 0.40 |
| Centrifugal settling velocity $V_{cs}$ | m/s | 0.219 |
| $V_{cs}$ corrected for concentration effects | m/s | 0.095 |
| Cumulative centrifugal length of elbow sections | m | 17.59 |
| Total settling time in elbow sections | s | 1.955 |
| Total settling distance in elbow sections | m | 0.186 |
| Cumulative centrifugal settling distance ratio |  | 0.27 |
| Overall cumulative settling distance ratio |  | 0.67 |
| 0.084 * (V − 6.62) + (0.69 − SVCR) * 1.666 |  | 0.40 |

It can be seen from Table 5 that the overall cumulative settling distance ratio CSD is 0.67, which is outside the requirement of the present invention that it should be below the lower of 037 or 0.40 (for a circulation velocity of 9 m/s and a solids volume concentration ratio SVCR of 0.57).

The effect of this high CSD can be seen by calculating an approximate concentration profile for the slurry in its passage around the reactor as in Example 3 above. In this case the average movement of the particles in the direction of settling is 0.067D every 10% of the "settling length" of the reactor, which means that by the time the flow has reached 60% of the way round the reactor, the particles are packed to their maximum possible concentration at one side of the reactor and no further movement is possible. With over 60% of the diameter of the reactor packed to greater than 70% of the maximum possible solids volume concentration for 40% of the length of the reactor, significant problems would be expected.

TABLE 14

| | solids volume concentration ratio | | | | | | | | | | |
| --- | --- | --- | --- | --- | --- | --- | --- | --- | --- | --- | --- |
| X- | Distance along length of reactor in direction of flow (%) | | | | | | | | | | |
| sections | 0 | 10 | 20 | 30 | 40 | 50 | 60 | 70 | 80 | 90 | 100 |
| 0-10 | 0.57 | 0.19 | 0.0 | 0.0 | 0.0 | 0.0 | 0.0 | 0.0 | 0.0 | 0.0 | 0.0 |
| 11-20 | 0.57 | 0.57 | 0.38 | 0.0 | 0.0 | 0.0 | 0.0 | 0.0 | 0.0 | 0.0 | 0.0 |
| 21-30 | 0.57 | 0.57 | 0.57 | 0.57 | 0.19 | 0.0 | 0.0 | 0.0 | 0.0 | 0.0 | 0.0 |
| 31-40 | 0.57 | 0.57 | 0.57 | 0.57 | 0.57 | 0.38 | 0.0 | 0.0 | 0.0 | 0.0 | 0.0 |
| 41-50 | 0.57 | 0.57 | 0.57 | 0.57 | 0.57 | 0.57 | 0.70 | 0.70 | 0.70 | 0.70 | 0.70 |
| 51-60 | 0.57 | 0.57 | 0.57 | 0.57 | 0.57 | 0.75 | 1.00 | 1.00 | 1.00 | 1.00 | 1.00 |
| 61-70 | 0.57 | 0.57 | 0.57 | 0.57 | 0.80 | 1.00 | 1.00 | 1.00 | 1.00 | 1.00 | 1.00 |
| 71-80 | 0.57 | 0.57 | 0.57 | 0.85 | 1.00 | 1.00 | 1.00 | 1.00 | 1.00 | 1.00 | 1.00 |
| 81-90 | 0.57 | 0.57 | 0.90 | 1.00 | 1.00 | 1.00 | 1.00 | 1.00 | 1.00 | 1.00 | 1.00 |
| 91-100 | 0.57 | 0.95 | 1.00 | 1.00 | 1.00 | 1.00 | 1.00 | 1.00 | 1.00 | 1.00 | 1.00 |

The invention claimed is:

1. Process for polymerising, in a loop reactor, at least one olefin monomer in a liquid diluent to produce a slurry comprising solid particulate olefin polymer and said diluent, wherein the ratio between the actual volumetric solids concentration of the slurry and the maximum possible geometric volume solids concentration of the slurry as measured by the bulk density of an unpacked settled bed of particles, SVCR, is V*0.065 or greater, and the ratio of the cumulative settling distance of an average size particle at any point in the reactor in any direction perpendicular to the direction of the flow, to the internal diameter of the loop reactor, is maintained below [0.084*(V−6.62)+(0.69−SVCR)*1.666], where V is the circulation velocity of the slurry in m/s and "cumulative settling distance" is defined as the cumulative distance, expressed as a fraction of the diameter, travelled by a particle in any direction perpendicular to the direction of the flow since the previous upstream pump.

2. Process according to claim 1 wherein V is less than 9.5 m/s.

3. Process according to claim 1, wherein the ratio of the cumulative settling distance of an average size particle at any point in the reactor in any direction perpendicular to the direction of the flow, to the diameter of the loop reactor, is maintained below 0.37.

4. Process for polymerising, in a loop reactor, at least one olefin monomer in a liquid diluent to produce a slurry comprising solid particulate olefin polymer and said diluent, wherein the circulation velocity of the slurry in m/s, V, is less than 9.5 m/s, and the ratio of the cumulative settling distance of an average size particle at any point in the reactor in any direction perpendicular to the direction of the flow, to the internal diameter of the loop reactor, is maintained below the smaller of 0.37 or [0.084*(V−6.62)+(0.69−SVCR)*1.666], where SVCR is the ratio between the actual volumetric solids concentration of the slurry and the maximum possible geometric volume solids concentration of the slurry as measured by the bulk density of an unpacked settled bed of particles, and "cumulative settling distance" is defined as the cumulative distance, expressed as a fraction of the diameter, travelled by a particle in any direction perpendicular to the direction of the flow since the previous upstream pump.

5. Process according to claim 4 wherein the SVCR is at least V*0.065.

6. Process according to claim 1, wherein the ratio of the cumulative settling distance of an average size particle at any point in the reactor in any direction perpendicular to the direction of the flow, to the diameter of the loop reactor, is maintained below 0.9*[0.084*(V−6.62)+(0.69−SVCR)*1.666].

7. Process according to claim 1, wherein the ratio of the cumulative settling distance of an average size particle at any point in the reactor in any direction perpendicular to the direction of the flow, to the diameter of the loop reactor, is maintained below 0.8*[0.084*(V−6.62)+(0.69−SVCR)*1.666].

8. Process according to claim 1, wherein V is less than 9 m/s.

9. Process according to claim 1, wherein the loop reactor has eight vertical legs, and the horizontal sections joining the tops of the legs all have the same horizontal orientation.

10. Process according to claim 1, wherein no more than four horizontal sections joining the bottoms of the vertical legs of the loop reactor have the same horizontal orientation.

11. Process according to claim 1, wherein the length to diameter ratio (L/D) of the horizontal sections in the loop reactor is no greater than 12.

12. Process according to claim 1, wherein the ratio of elbow radius to diameter in the reactor is no greater than 4.

13. Process according to claim 1, wherein the temperature and pressure in the loop reactor are in the range 70-100° C. and 20-40 bar, and the diluent has a density of at least 500 kg/m3.

* * * * *